United States Patent
Younes et al.

(10) Patent No.: US 7,023,804 B1
(45) Date of Patent: Apr. 4, 2006

(54) NON-DISRUPTIVE MONITORING OF TRAFFIC FLOWS IN A CONNECTION-ORIENTATED PACKET NETWORK

(75) Inventors: Amro A. Younes, Santa Clara, CA (US); Charles H. Mitchell, Nepean (CA); Tara Janke, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/558,589

(22) Filed: Apr. 26, 2000

Related U.S. Application Data (60) Provisional application No. 60/135,104, filed on Apr. 28, 1999.

(51) Int. Cl.
*H04L 12/56* (2006.01)

(52) U.S. Cl. ............... 370/236; 370/252; 370/390; 370/392; 370/395.3

(58) Field of Classification Search ............... 370/355, 370/389, 390, 395.1, 252, 236, 250, 392, 370/395.3

See application file for complete search history.

(56) References Cited

U.S. PATENT DOCUMENTS

| 5,684,797 | A | * | 11/1997 | Aznar et al. | 370/390 |
| 5,959,972 | A | * | 9/1999 | Hamami | 370/228 |
| 6,052,373 | A | * | 4/2000 | Lau | 370/399 |
| 6,147,992 | A | * | 11/2000 | Giroir et al. | 370/390 |

OTHER PUBLICATIONS

"ATM Test Access Function (ATAF), Version 1.0", The ATM Forum Technical Committee, AF-TEST-NM-0094.000, Feb., 1998.

\* cited by examiner

*Primary Examiner*—Alpus H. Hsu
*Assistant Examiner*—Justin Philpott
(74) *Attorney, Agent, or Firm*—McCarthy Tétrault LLP (57) ABSTRACT

The method for the non-disruptive monitoring of a packet flow from a target point (e.g., a specific port/VPI/VCI) to a counterpart point in a packet switch having one or more interface devices, connected to an internal bus, for servicing the target point, the counterpart point and a monitor test access connection (TAC) point comprises the steps of: (a) configuring the device servicing the TAC point to retrieve from the bus packets addressed thereto which use a multicast addressing scheme for routing packets from the target point to the counterpart point and from the target point to the monitor TAC point; (b) configuring the device servicing the counterpart point to additionally retrieve the multicast packets from the bus; and (c) configuring the device servicing the target point to address packets received thereat to the counterpart point and the monitor TAC point using the multicast address scheme only after step (b) is completed.

31 Claims, 9 Drawing Sheets

NON-DISRUPTIVE MONITORING OF TRAFFIC FLOWS IN A CONNECTION-ORIENTATED PACKET NETWORK

This application claims the benefit of Provisional Application No. 60/135,104 filed Apr. 28, 1999.

FIELD OF INVENTION

The invention relates generally to the art of packet-switching systems and more specifically to a method and apparatus for the non-disruptive monitoring of traffic flows in a connection-orientated packet-switched network, such as an ATM network.

BACKGROUND OF INVENTION

Telecommunication service providers have typically provided their customers with test access connection (TAC) capability for circuit-switching systems in order to monitor a given point-to-point call or connection. A monitor TAC basically converts a point-to-point connection into a point-to-multipoint connection, wherein one of the multipoints is the original connection endpoint and the other, new, endpoint or leaf terminates at a TAC port which is connected to test equipment. The switching technologies typically used in circuit-switched networks, e.g., step-by-step, panel & crossbar switching cores, conveniently enable a point-to-point connection to be converted into a point-to-multipoint connection on-the-fly, i.e., while the call is in progress, without disrupting the original call. This is because the added connection or new leaf is typically merely a parallel electrical connection in the switching core.

Customers of connection orientated packet-switching systems have also desired to be provided with monitor TAC capability. However, conventional connection-orientated packet-switching technologies typically do not enable a packet stream to be monitored without causing service disruption. This is because, simplistically speaking, connection-orientated packet switches typically employ some sort of look up routing table to provide the necessary internal addressing to route packets of a point-to-point connection through the switch, i.e. from an ingress card servicing an input port to an egress card servicing an output port. The output of the lookup table is typically added as overhead information to the packet which is examined by various components of the switch in order to implement the internal routing function. In order to convert a point-to-point connection into a point-to-multipoint connection, the look up table typically has to be modified to provide different overhead information which indicates to the internal switch components that the packet has to be copied, multi-cast or otherwise addressed to multiple endpoints on one or more output ports. This generally requires the packet switch to tear down the point-to-point call and re-setup the call as a point-to-multipoint connection, causing significant service disruption.

SUMMARY OF INVENTION

Broadly speaking, the invention provides a method and apparatus for the non-disruptive monitoring of traffic flows in a packet-switched network, such as a connection-orientated ATM network.

According to one aspect of the invention, a method is provided for converting a point-to-point packet flow from a first point to a second point in a packet switch into a point-to-multipoint packet flow from the first point to the second point and from the first point to a third point in the packet switch without disrupting the packet flow from the first point to the second point, in a switch which comprises one or more interface devices, connected to an internal bus, for servicing the first, second and third points. The method comprises the steps of: (a) configuring the device servicing the third point to retrieve from the bus packets addressed thereto which are associated with a point-to-multipoint overhead for routing packets from the first point to the second point and from the first point to the third point; (b) configuring the device servicing the second point to additionally retrieve from the bus the packets associated with the point-to-multipoint overhead; and (c) configuring the device servicing the first point to address packets received at the first point to the second and third points using the point-to-multipoint overhead after step (b) is completed.

In addition, by (d) configuring the device servicing the third point to stop retrieving the packets associated with the point-to-multipoint overhead; (e) configuring the device servicing the first point to address packets received thereat only to the second point; and (f) configuring the device servicing the second point to stop retrieving the packets associated with the point-to-multipoint overhead only after step (e) is completed, the flow of packets to the third point may be terminated without disrupting the flow of packets to the second point.

As used in this specification, the term "packet" refers to any fixed or variable length message or package of information. In the preferred embodiment, the packet comprises a fixed length ATM or ATM-like cell.

In an aspect of the present invention, there is a method of processing a stream of data packets in a packet switch to facilitate monitoring of the stream. The packet switch has one or more interface devices for servicing an input point, a first output point and a second output point of the switch. The method comprises the steps of: (a) configuring the device servicing the input point to attach overhead associated with a point-to-point connection to packets received at the input point in order to route the packets to the first output point; (b) configuring the device servicing the first output point to receive and process the packets having the point-to-point overhead attached thereto; (c) configuring the device servicing the second output point to receive and process packets having overhead attached thereto which is associated with a point-to-multipoint connection for routing packets from the input point to the first output point and from the input point to the second output point; (d) configuring the device servicing the first output point to additionally receive and process packets having the point-to-multipoint overhead attached thereto, wherein the configuration of the device servicing the first output point that results from step (b) remains unchanged; and (e) only after step (d) is completed, configuring the device servicing the input point to attach the point-to-multipoint overhead to packets received at the input point instead of attaching the overhead associated with the point-to- point connection, thereby converting a point-to-point packet flow into a point-to- multipoint packet flow and enabling monitoring of data packets arriving at the second output point without disrupting the point-to-point packet flow.

The method may further comprise the steps of: (f) configuring the device servicing the second output point to stop receiving and processing packets having the point-to-multipoint overhead; (g) configuring the device servicing the input point to attach the point-to-point overhead to packets received at the input point; and (h) configuring the device servicing the first output point to stop receiving and processing packets having the point-to-multipoint overhead only after step (g) is completed, thereby terminating the flow of packets to the second output point without disrupting the flow of packets to the first output point.

Each switch point may be referenced by at least an address of the interface device within the switch and a virtual path identifier. The point-to-point overhead may comprise a unique interface device address. The point-to-multipoint overhead may comprise a multicast interface card address referencing a plurality of interface cards. The point-to-point overhead and the point-to-multipoint overhead may comprise identical bitmaps, wherein the setting of a single bit identifies a point-to-point connection and the setting of plural bits identifies a point-to-multipoint connection.

The packet may be a fixed-length cell. The packet switch may be a connection-oriented switch.

In another aspect of the present invention, there is a method for converting a point-to-point packet flow from a first point to a second point in a packet switch into a point-to-multipoint packet flow from the first point to the second point and from the first point to a third point in the packet switch for monitoring packets arriving at the packet switch without disrupting the point-to-point packet flow. The switch comprises one or more interface devices, connected to an internal switch bus, for servicing the first, second and third points. The method comprises the steps of: (a) configuring the device servicing the third point to retrieve from the bus packets addressed thereto which use a multicast addressing scheme for routing packets from the first point to the second point and from the first point to the third point; (b) configuring the device servicing the second point to additionally retrieve from the bus the multicast packets, wherein the device servicing the second point maintains an existing configuration to retrieve, from the bus, packets forming part of the point-to-point packet flow and which use a unicast addressing scheme; (c) only after step (b) is completed, configuring the device servicing the first point to address packets received at the first point to the second and third points using the multicast addressing scheme; and(d) monitoring the multicast packets arriving at the third point.

The method may further comprise the steps of:(e) configuring the device servicing the third point to stop retrieving the multicast packets; (f) configuring the device servicing the first point to address packets received thereat only to the second point; and (g) only after step (e) is completed, configuring the device servicing the second point to stop retrieving the multicast packets, thereby terminating the flow of packets to the third point without disrupting the flow of packets to the second point.

The unicast addressing scheme may comprise a unique interface card address. The multicast addressing scheme may comprise a multicast interface card address referencing a plurality of interface cards. The unicast addressing scheme and the multicast addressing scheme may comprise identical bitmaps, wherein the setting of a single bit identifies a point-to-point connection and the setting of plural bits identifies a point-to-multipoint connection. The packet may be a fixed-length cell.

In still another aspect of the present invention, there is a method of processing a stream of data packets in a packet switch arriving at an input point thereof to facilitate monitoring of the stream. The method comprises the steps of: (a) attaching overhead associated with a point-to-point connection to packets received at the input point in order to route the packets to a first output point; (b) receiving and processing the packets having the point-to-point overhead attached thereto at the first output point; (c) configuring a device servicing the first output point to additionally receive and process packets having overhead attached thereto which is associated with a point-to-multipoint connection for routing packets from the input point to the first output point and from the input point to a second output point, wherein the device servicing the first output point maintains an existing configuration to receive and process packets having the point-to-point overhead attached thereto; (d) only after step (c) is completed, attaching the point-to-multipoint overhead to packets received at the input point; and (e) receiving and processing the packets having the point-to-multipoint overhead attached thereto at the second output point, thereby converting a continuous point-to-point packet flow into a point-to-multipoint packet flow and enabling monitoring of data packets arriving at the second output point without disrupting the point-to-point packet flow.

The point-to-point overhead may comprise a unique interface card address. The point-to-multipoint overhead may comprise a multicast interface card address referencing a plurality of interface cards. The point-to-point overhead and the point-to-multipoint overhead may comprise identical bitmaps, wherein the setting of a single bit identifies a point-to-point connection and the setting of plural bits identifies a point-to-multipoint connection.

The method may further comprise the steps of: (f) terminating the reception and processing of packets having the point-to-multipoint overhead at the second output point; (g) attaching the point-to-point overhead to packets received at the input point; and (h) terminating the reception and processing of packets having the point-to-multipoint overhead at the first output point only after step (g) is completed, thereby terminating the flow of packets to the second output point without disrupting the flow of packets to the first output point.

Each switch point may be referenced by at least an address of an interface card within the switch and a virtual path identifier. The point-to-point overhead may comprise a unique interface card address. The point-to-multipoint overhead may comprise a multicast interface card address referencing a plurality of interface cards. The point-to-point overhead and the point-to-multipoint overhead may comprise identical bitmaps, wherein the setting of a single bit identifies a point-to-point connection and the setting of plural bits identifies a point-to-multipoint connection. The packet may be a fixed-length cell.

In yet another aspect of the present invention, there is a method of non-disruptive monitoring of a point-to-point (P2P) connection established in a connection oriented network across a switching node. The method comprises: (a) receiving at a point A on an ingress interface of the switching node a protocol data unit (PDU) carried in the P2P connection and routing the PDU to a point B on an egress interface of the switching node, the P2P connection extending through the point A to the point B; (b) receiving a request for monitoring the P2P connection in the point A and creating a test point C on a second egress interface of the switching node; (c) configuring the point A, point B and test point C for establishing a point-to-multipoint (P2M) connection between the points A and B and between the point A and test point C, without impairing operation of the P2P connection; (d) switching the PDU from the P2P connection to the P2M connection without tearing down the P2P connection; and (f) at the test point C, monitoring and testing the PDU and other PDU's arriving at the point A along the P2P connection.

Step (a) may comprise: assembling a unicast header based on a network address of the PDU, the unicast header having an egress connection identifier identifying the point B as a unique destination of the PDU arriving from the point A via the P2P connection, and providing the egress connection identifier to the points A and B; and appending the unicast header to the PDU and, based on the egress connection identifier, perform the routing the PDU to the point B. After the routing the PDU to the point B, at the point B determining the network address of the PDU based on the egress connection identifier in the unicast header, stripping the unicast header from the PDU, mapping the network address into the PDU, and transmitting the PDU from the point B to a destination address provided by the network address.

Step (b) may comprise: (b1) checking validity of the point A by confirming whether the point A is an endpoint of the P2P connection on the switching node; (b2) checking whether the switching node enables routing of a monitor test access connection associated with the P2M connection between the point A and the test point C; and (b3) if the checking steps b1) and b1) both return an affirmative result, updating a routing table of the switching node to account for the monitor test access connection.

Step (c) may comprise: assembling a multicast header based on the network address of the PDU, the multicast header including a multicast connection identifier and providing the multicast connection identifier to the points A, B and C; configuring the point B to receive any PDU received from the point A having the unicast connection identifier and the multicast connection identifier; configuring the point A to additionally enable transmission of the PDU along the P2M connection using the multicast connection identifier after the point B is ready to receive PDU's with the multicast connection identifier; and configuring the test point C to receive any PDU received from the point A and having a multicast connection identifier of the multicast connection identifier.

Step (d) may comprises, at the point A: appending the multicast header to the PDU; transmitting the PDU with the multicast header in the P2M connection to the point B using the multicast connection identifier rather than in the P2P connection using the unicast connection identifier; and transmitting a duplicate of the PDU with the multicast header from the point A to the test point C using the multicast connection identifier.

The method may further comprise: (f) tearing-down the P2M connection once the monitoring of PDU's arriving at the point A along the P2P connection is completed. Step (f) may comprise: (f1) configuring the point A to append the unicast header to incoming PDU's and transmitting the incoming PDU's along the P2P connection rather than along the P2M connection; (f2) after completing step f1), deleting the multicast connection identifier at the points A, B and C to disable the P2M connection.

BRIEF DESCRIPTION OF DRAWINGS

For the purposes of description, but not of limitation, the foregoing and other aspects of the invention are explained in greater detail with reference to the accompanying drawings, wherein.

DETAILED DESCRIPTION OF PREFERRED EMBODIMENTS

The preferred embodiment is discussed in relation to a prior art model 36170 Mainstreet Xpress™ ATM packet switch manufactured by Newbridge Networks Corporation of Kanata, Ontario. The basic architecture of this switch is disclosed in PCT Publication No. WO95/30318 (corresponding to PCT Application No. PCT/CA95/00248) published on Nov. 9, 1995 and owned by the assignee of the present application, which disclosure is incorporated herein by reference in its entirety.

Figure 1:
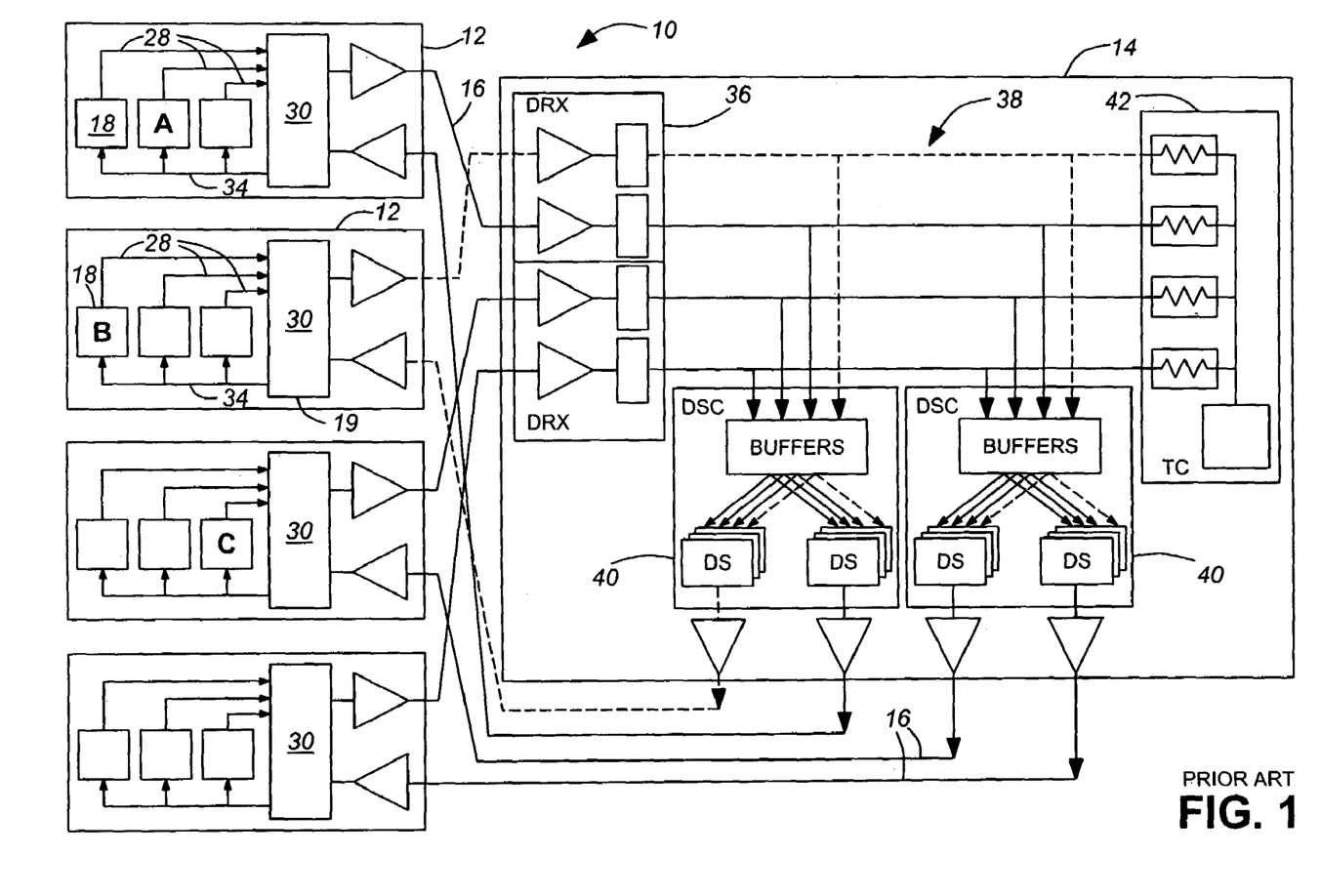
FIG. 1 is a block diagram illustrating the architecture of a preferred packet switch, including interface cards thereof.

FIG. 1 illustrates at a high level the architecture of the preferred 36170 ATM packet switch 10. The switch 10 comprises at least one peripheral access shelf 12 which features a plurality of universal card slots (UCS) for housing a variety of interface cards 18 or system cards 19. In the illustrated embodiment, four peripheral shelves 12 are shown, with each shelf housing three interface cards 18. The peripheral shelves 12 are connected to a switching fabric or core 14 (which resides on a separate shelf) via a plurality of high speed fibre optic buses 16 termed Intershelf Links (hereinafter "ISL bus 16").

On each peripheral shelf 12, the interface cards 18 thereof are connected in a star topology for the transfer of data towards the switching core 14. A hub card 30 (which is one type of system card) multiplexes a plurality of "Add" buses 28 from the various interface cards 18 on shelf 12 to an uplink portion of the high speed ISL bus 16. The hub card 30 also terminates a downlink portion of the ISL bus 16 from the switching core 14 and drives a multi-drop bus 34 which feeds interface cards 18.

The switching core 14 comprises at least one dual receiver card (DRX) 36 (one DRX is shown) which formats incoming data from the uplink portion of ISL bus 16 into a form suitable for transmission onto a parallel backplane bus 38. A termination card (TC) 42 provides electrical termination for the backplane bus 38. At least one dual switching card (DSC) 40 (two DSCs are shown) is connected to the backplane bus 38. The function of each DSC 40, as explained in greater detail below, is to examine the backplane bus 38 to determine whether any packets, e.g. ATM cells, are intended for the peripheral shelves 12 serviced by the particular DSC 40 and, if so, to copy the cell off bus 38 and into one of a plurality of down ISL queues (DS) 44 for subsequent transmission of the cell over the proper downlink portion of the ISL bus 16 to the correct peripheral shelf 12. In this manner, any interface or system card can communicate with any other interface or system card.

Figure 2:
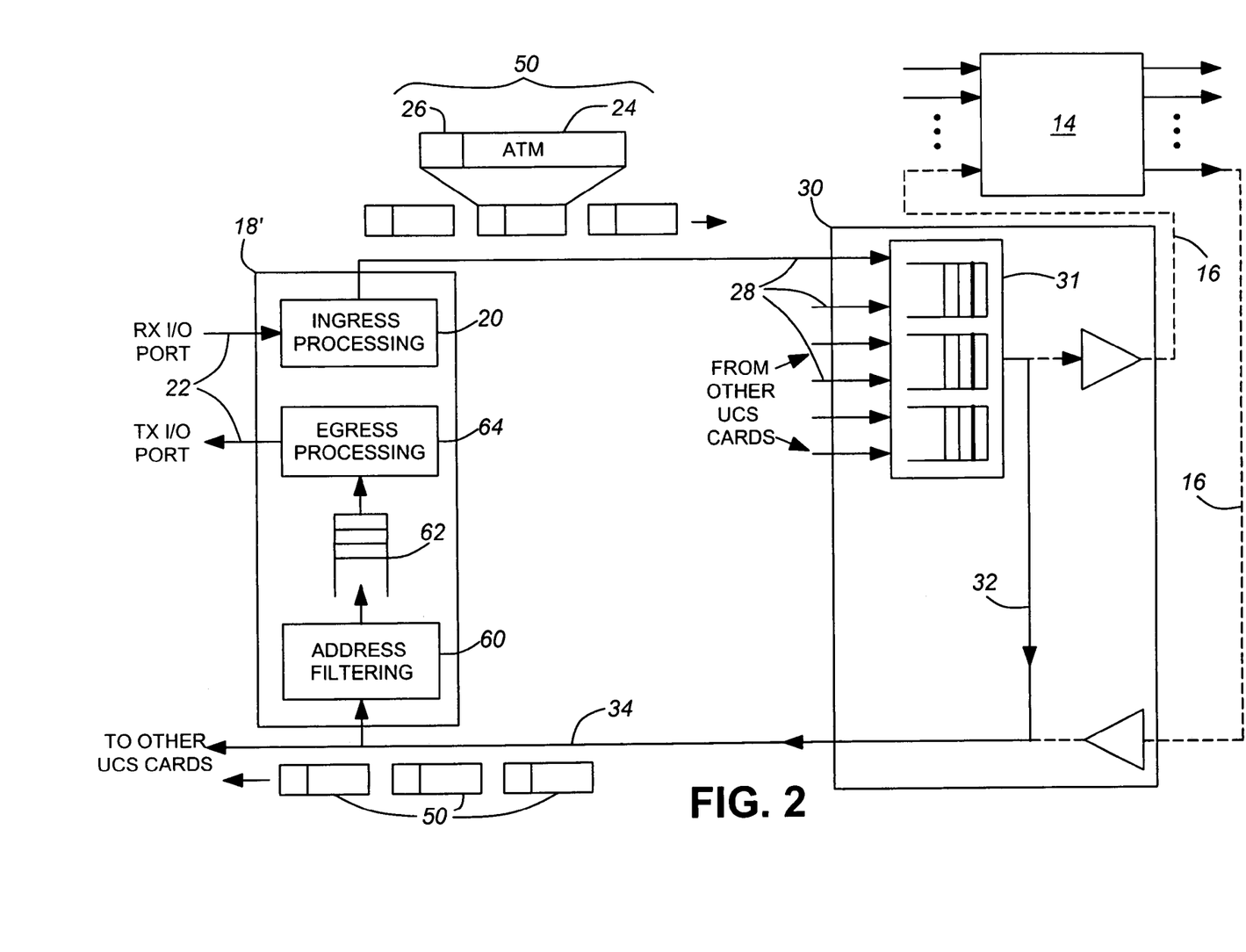
FIG. 2 is a block diagram illustrating in greater detail the structure of a preferred interface card employed in the packet switch.

Referring additionally to FIG. 2, one example of interface card 18 is an ATM cell relay card 18' which transmits and receives ATM cells over a port 22 between an external ATM aggregate source and the switching core 14. Interface card 18' comprises an ingress processing means 20 for converting incoming ATM cells 24 from the input side of port 22 into ATM-like cells termed Newbridge ATM (NATM) cells 50. This is accomplished by examining the VPI/VCI field of incoming ATM cell 24 and, based on this field, attaching a proprietary tag or header 26 to the ATM cell which is used to identify an internal address for routing the ATM cell. The NATM cell 50 is routed toward the switching core 14 over local Add bus 28.

Figure 3:
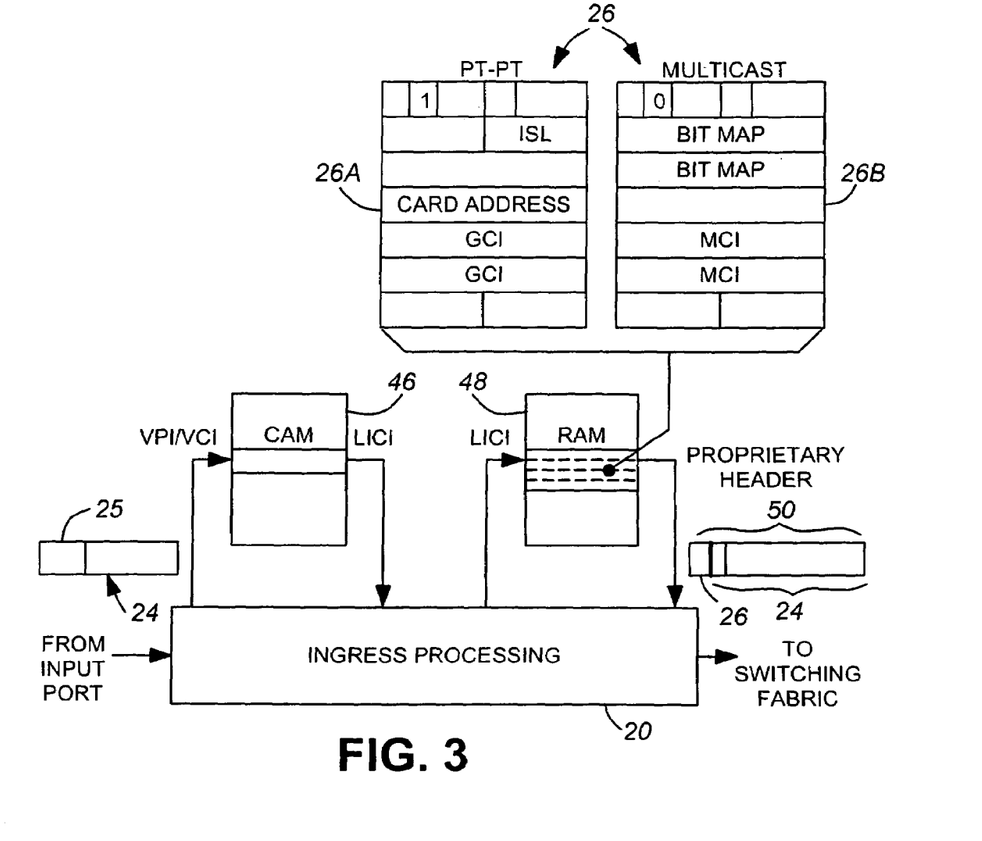
FIG. 3 is a data flow diagram illustrating how the interface cards process incoming packets (hereinafter "ingress processing")

FIG. 3 is a data flow diagram which illustrates the ingress processing in greater detail. As illustrated, the ingress processing means 20 reads VPI/VCI field 25 of ATM cell 24 and uses that value to look up a pointer in a contents addressable memory (CAM) 46 termed a local ingress connection identifer (LICI). The CAM 46 provides a means as known to those skilled in the art for compacting an address space and economizing on the amount of memory required to look up a value based on the large address space provided by the VPI/VCI fields. The LICI, in turn, points to an entry in RAM memory 48 wherein the proprietary header 26 for the specific link designated by the VPI/VCI field is stored. The ingress processing means 20 retrieves the header 26 and forms the 60 byte NATM cell 50 which is routed to the switching core 14.

In accordance with the preferred embodiment, the header 26 consists of seven (7) bytes pre-pended to the standard 53 byte ATM cell 24 in order to form the NATM cell 50 which is 60 bytes long. The information provided by the header is used to uniquely address any port 22 on any UCS housing any interface card 18, and to identify the priority of the attached ATM cell 24. The header 26 is also used to support a multi-casting capability where the address field identifies a group of UCS interface ports.

Figure 4:
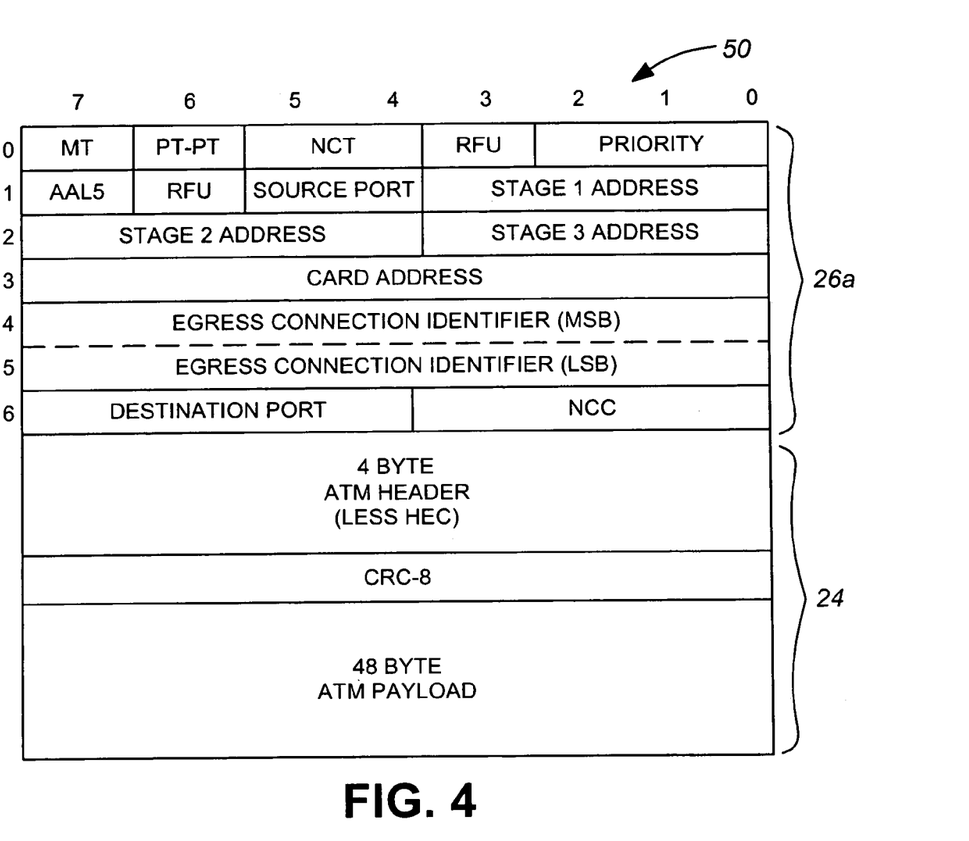
FIGS. 4 and 5 are schematic diagrams illustrating the structures of preferred headers pre-pended to incoming packets by the interface cards during the ingress processing thereof.

There are two cell types defined by the proprietary header 26: (a) point-to-point, and (b) point-to-multipoint. FIG. 4 illustrates the NATM cell 50 incorporating header 26a for implementing a point-to-point connection. The meaning of certain fields of header 26a are defined in Table A below (the other fields not defined below are more fully described in PCT Publication No. WO95/30318):

TABLE A

| FIELD NAME | DESCRIPTION |
| --- | --- |
| Pt—Pt | Indicates addressing is either for a point-to-point or for a point-to-multipoint connection.<br>"1" = point-to-point;<br>"0" = point-to-multi point. |
| Source Port | Indicates the cell's ingress port.<br>Range: 1 . . . 3.<br>Zero is illegal. |
| Stage 1/Stage 2/Stage 3 Address | These fields each allow the selection of one output out of 16 from a switching shelf, with the capability of having 3 stages of switching shelf. |
| Card Address | This field uniquely identifies a destination element within an ISL. |

TABLE A-continued

| FIELD NAME | DESCRIPTION |
| --- | --- |
| Egress Connection Identifer (ECI) | This field is set on ingress by interface cards and identifies the connection at the egress point. It is used for performing address translation and statistics gathering on egress. |
| Port | Used by multi-port interface cards to address a port (from up to 16). |

Figure 5:
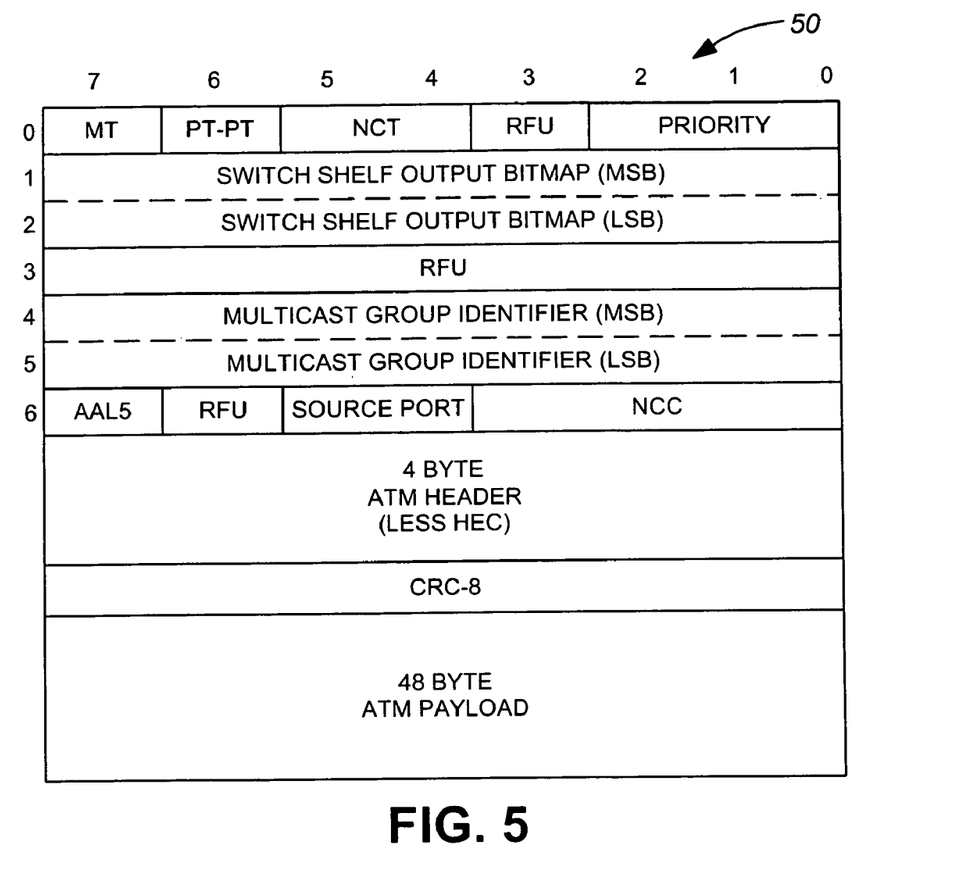

Transmitting ATM cells 24 which are part of a point-to-multipoint connection requires that the cell be routed to every drop bus 34 which has an interface card 18 that is part of the multi-cast group. The cell must also contain a multi-cast identifer that each card checks to determine if the card is part of the predetermined multi-cast group for the cell. This group can then be used to determine which ports of the UCS cards are to use the cell, i.e., which interface cards 18 are to receive the data. FIG. 5 illustrates NATM cell 50 incorporating header 26b for implementing point-to-multi-point connection. The meaning of certain fields of header 26b are defined in Table B below (the other fields not defined below are more fully described in PCT Publication No. WO95/30318):

TABLE B

| FIELD NAME | DESCRIPTION |
| --- | --- |
| Pt—Pt | Indicates addressing is either for a point-to-point or for a point-to-multipoint connection.<br>"1" = point-to-point;<br>"0" = point-to-multipoint. |
| Switch Shelf Output Bitmap Source Port | A multicast cell may be routed to multiple drop busses. This is accomplished by bit mapping the output ports of the switching shelf that the cell is to take. |
| Multicast Connection Identifier (MCI) | This field is set on ingress by the interface card and identifies a system wide unique multicast group. |
| Source Port | Indicates the cell's ingress port.<br>Range: 1 . . . 3. Zero is illegal. |

As shown in FIG. 2, the interface card 18' also includes a backplane address filtering means 60 for monitoring the multi-drop bus 34 and copying or receiving any NATM cell 50 thereon which is addressed to the card 18'. The multi-drop bus 34 operates at a relatively high speed, e.g., 800 Mb/s, and thus the card 18' may receive more NATM cells 50 then it can instantaneously deal with. In order to prevent cell loss, card 18' includes an output queueing means 62 for buffering outgoing NATM cell 50. An egress processing means 64 retrieves NATM cells 50 from the queues established by the queueing means 62 and maps the cells into the specific format of the physical interface for transmission on the output side of port 22.

Figure 6:
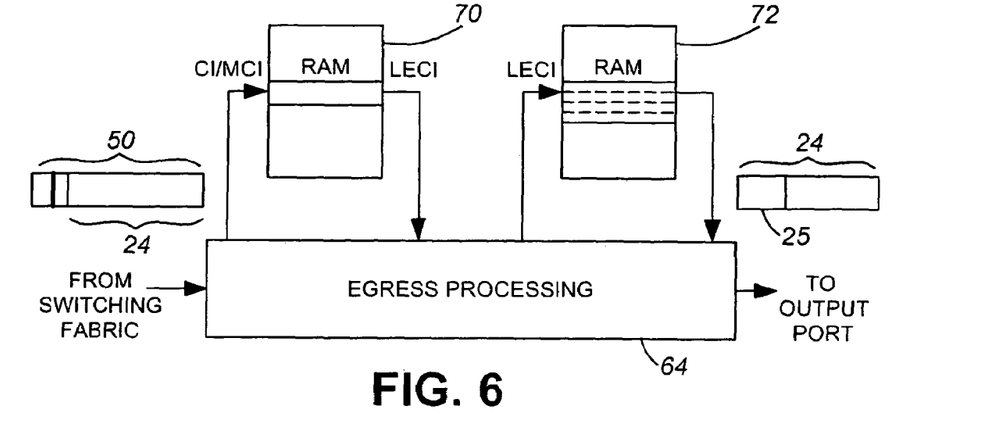
FIG. 6 is a data flow diagram illustrating how the interface cards process outgoing packets (hereinafter "egress processing")

FIG. 6 is a data flow diagram which illustrates the egress processing in greater detail. The egress processing means 64 reads the ECI (FIG. 4) or MCI field (FIG. 5) of the proprietary header 26a or 26b (as the case may be) of NATM cell 50 and uses that value to look up in a memory 70 a pointer termed a local egress connection identifier (LECI). The LECI, in turn, points to an entry in a memory 72 which stores an egress VPI/VCI value. The egress processing means 64 discards the header 26, retrieves that VPI/VCI from memory 72 and overwrites the original VPI/VCI field in the ATM cell 24 with the egress VPI/VCI value. In the foregoing manner, the preferred packet switch 10 provides a unidirectional cross-connect from an first port/VPI/VCI to a second port/VPI/VCI. For a bidirectional connection, another unidirectional cross-connect as described above is required to route packets from the second port/VPI/VCI to the first port/VPI/VCI.

Figure 7:
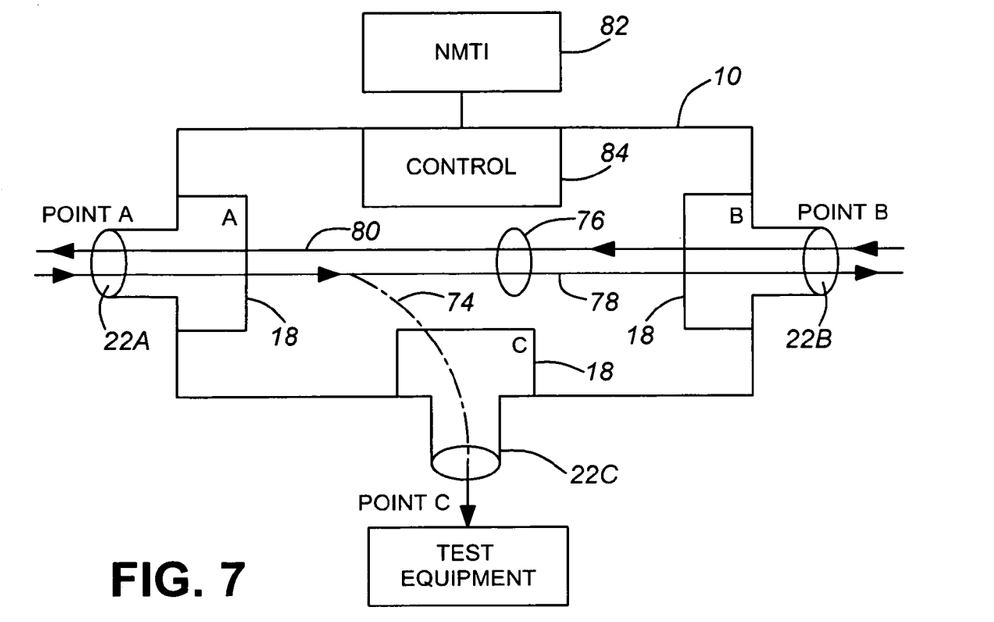
FIG. 7 is a schematic diagram illustrating the structure of a uni-directional test access connection in the packet switch.

FIG. 7 illustrates the function and structure of a monitor test access connection (TAC) 74. A bi-directional point-to-point connection 76 between points A and B comprises two unidirectional cross-connects 78 and 80 in switch 10 as described above. The monitor TAC 74 according to the preferred embodiment provides a copy or a duplicate of the ATM cell traffic from the ingress of target point A situated on port 22A to a TAC point C situated on port 22C without disrupting the cell stream between points A and B. This is accomplished by providing an on-the-fly conversion of a point-to-point connection to a point-to-multipoint connection without disrupting the cell stream between points A and B, as described above.

The monitor TAC is initiated, for example, by a command from a local network management terminal interface (NMTI) 82, as is known in the art per se, which is connected to a control card 84 (a type of system card) that resides in one UCS of one of the peripheral access shelves 12. The monitor TAC command sent by the NMTI 82 includes parameters specifying the address (i.e., shelf/slot/physical port/VPI/VCI) of the target point A, and the address of test endpoint C.

The control card 84 provides all common control and management facilities for switch 10, as is known in the art per se, including: (a) maintaining a configuration database; (b) maintaining a calls-in-progress or cross-connect database; (c) executing the node software; and (d) providing centralized connection and admission control (CAC) to determine whether or not a new connection should be accepted.

Figure 9:
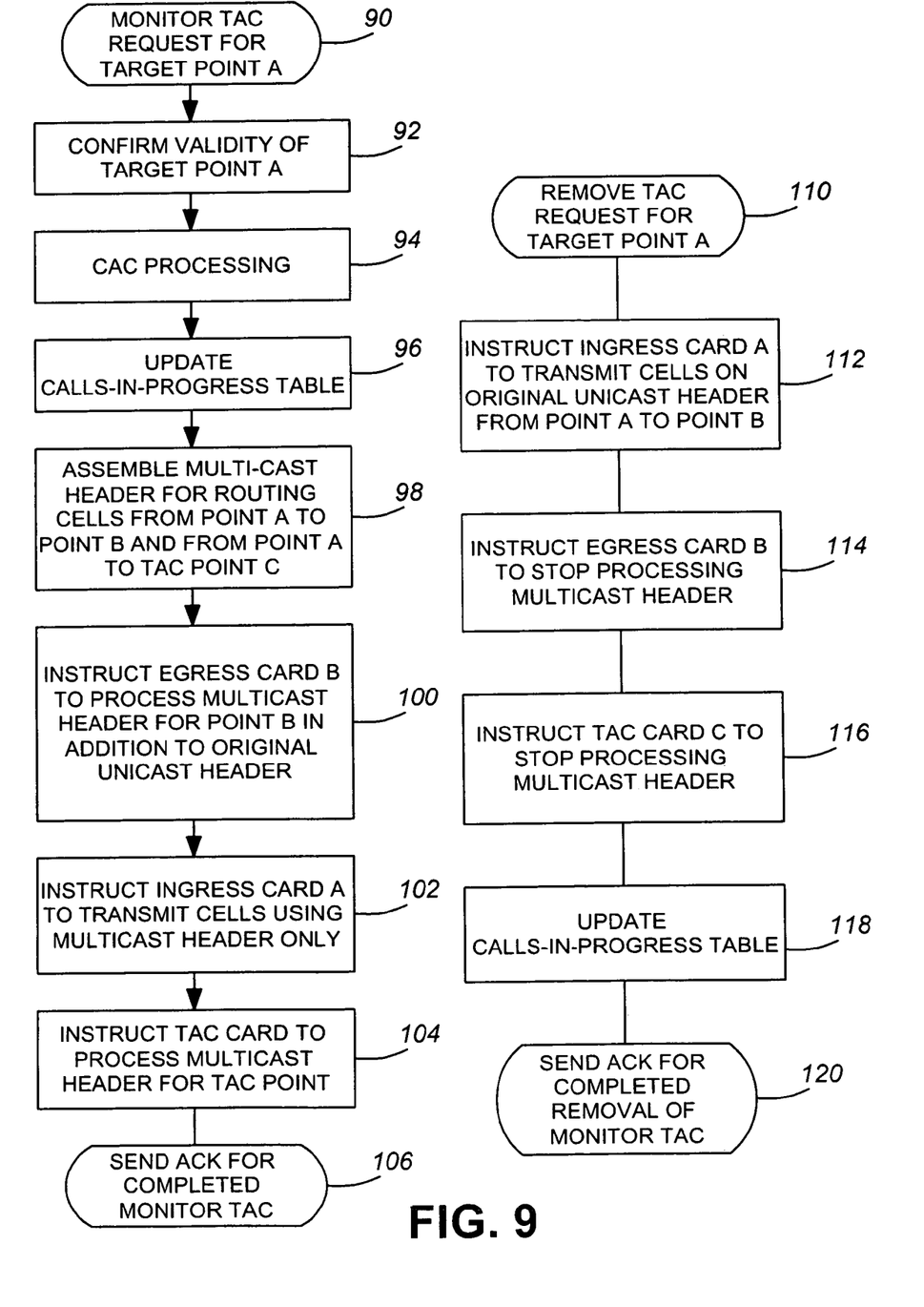
FIG. 9 is a flowchart illustrating a preferred process for establishing and releasing a unidirectional test access connection in the preferred packet switch without causing any service disruption to an original point-to-point connection.

The preferred process by which the control card 84 (which executes the node software) establishes the monitor TAC 74 is illustrated in the flowchart of FIG. 9. The process is initiated at step 90 when control card 84 receives a request to construct the monitor TAC 74 for target point A. At step 92, the control card 84 checks its centralized configuration database to ensure that point A is in fact an endpoint, relative to switch 10, of a functioning connection. At step 94, since a monitor TAC in effect adds a new leaf to point-to-point connection 76, the control card 84 executes CAC processing as known in the art per se in order to determine whether or not switch 10 has sufficient resources to permit a new connection. If so, at step 96 the control card 84 updates its internal calls-in-progress database to reflect the fact that point-to-point connection 76 will now be a point-to-multipoint connection.

At step 98, the control card 84 prepares or assembles a multicast or point-to-multipoint header 26b (FIG. 5), having an MCI field set to a value, $MCI_N$, required to route ATM cells 24 from target point A to counterpoint B and from target point A to TAC point C.

Figure 10A:
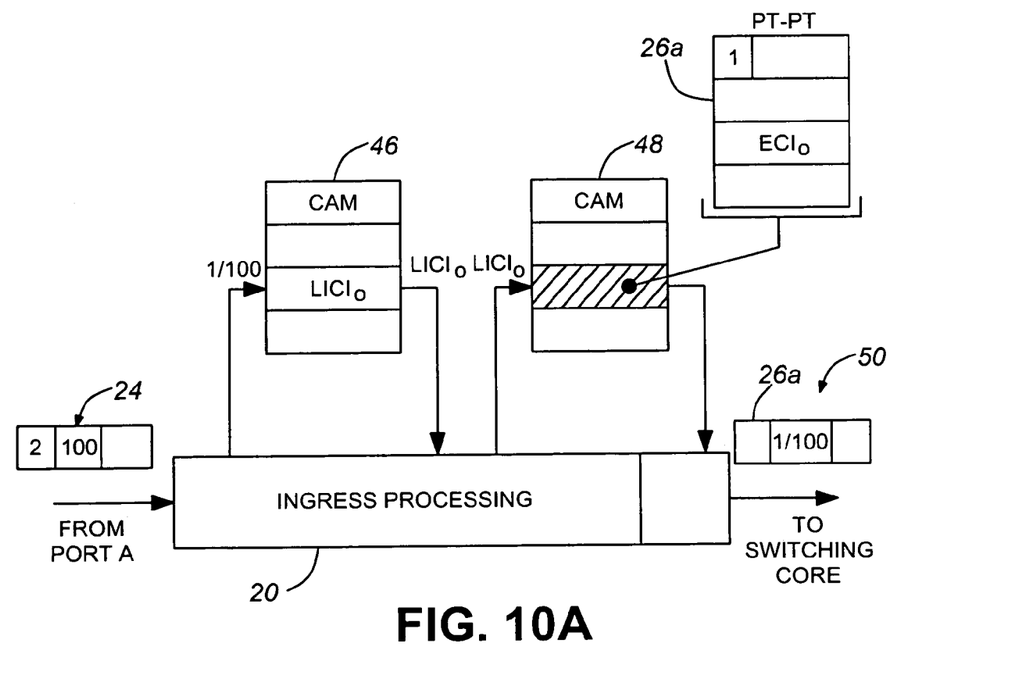
FIG. 10 is a series of data flow diagrams illustrating the effects the preferred process shown in FIG. 9 has on the ingress and egress processing of packets.
Figure 10B:
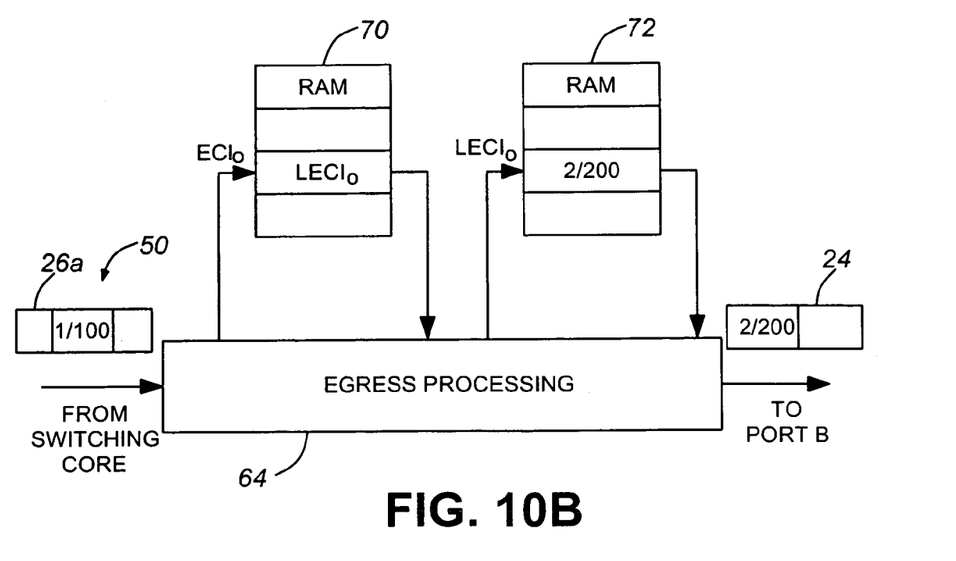
Figure 10C:
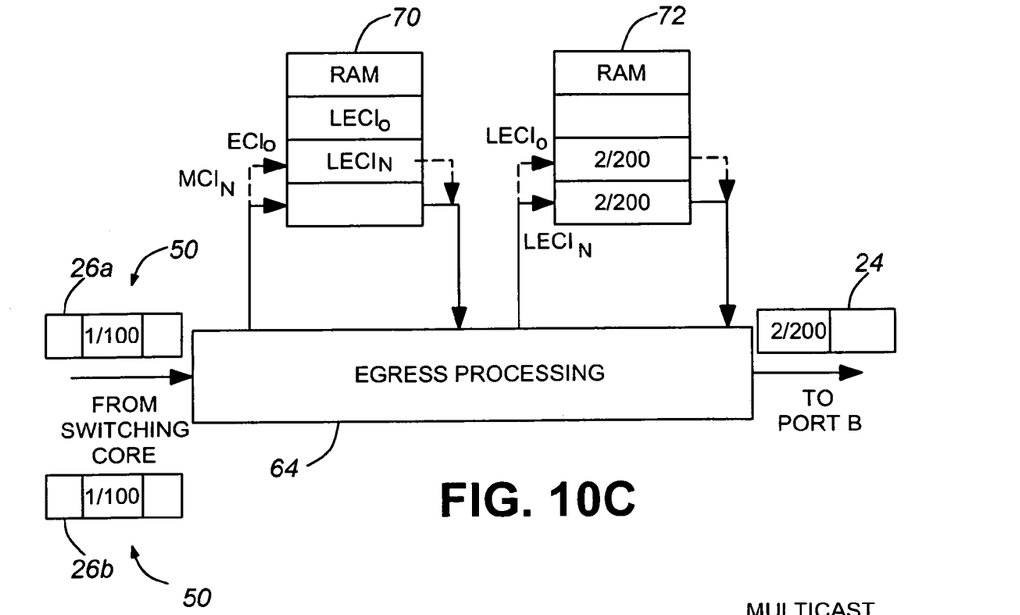

At step 100 of the FIG. 9 flowchart, the control card 84 sends a message, including the multi-cast header 26b assembled in step 98, to interface card B, which is the egress interface card with respect to cross-connect 78. The message instructs interface card B to add $MCI_N$ as an entry in memories 70 and 72 in order to map cells arriving from point A to point B and from point A to point C. This is in addition to the ECI entry of the original cross-connect 76 which only mapped cells arriving from point A to point B, i.e., the original ECI entry is not deleted. For instance, referring to the example configuration illustrated in FIGS. 10(a) to 10(d), consider target point A to have a VPI/CI=1/100, counterpoint B to have a VPI/VCI=2/200 and TAC point C to have a VPI/VCI=3/300. Initially, as shown in FIG. 10(a), the ingress processing means 20 receives an ATM cell 24 having VPI/VCI=1/100. The CAM 46 returns an LICI having a value $LICI_O$ which points to a unicast header 26a having an internal address or ECI value of $ECI_O$. For the original point-to-point connection 76 (FIG. 7) between target point A and counterpoint B, as shown in FIG. 10(b), the egress processing means 64 on card B initially retrieves ECIo from header 26a, which returns $LICI_O$ from RAM 70. In turn, $LECI_O$ points to a VPI/VCI in RAM 72 equal to 2/200, and thus the ATM cell 24 has its VPI/VCI field rewritten to now read 2/200, thereby effecting cell switching. As shown in FIG. 10(c), process step 100 causes the egress interface card B to add a new LECI entry, $LECI_N$, into RAM 70 which also points to a VPI/VCI entry of 2/200. $LECI_N$ is pointed to by $MCI_N$. However, the original $LECI_O$ entry in memory 70, which is pointed to by $ECI_O$, is not deleted therefrom.

The new LECI, $LECI_N$, points to a VPI/VCI entry of 2/200 in memory 72, and the original $LECI_O$ also points to a VPI/VCI entry of 2/200. Thus, after step 100 is completed, the egress processing means 64 will correctly switch all NATM cells 50 arriving from port A and featuring VPI/VCI=1/100 to port B, with VPI/VCI=2/200, whether cell 50 incorporates unicast header 26a having internal address $ECI_o$ or multicast header 26b having internal addresses defined by $MCI_N$. At this stage of setting up the TAC, however, the ingress processing means 64 of ingress interface card A (FIG. 10(a)) has not yet been instructed to change the manner by which it processes incoming ATM cells, and hence NATM cells 50 continue to arrive at the egress interface card B using the initial $ECI_O$ for the original point-to-point cross-connect 78 between target point A and counterpoint B.

Figure 10D:
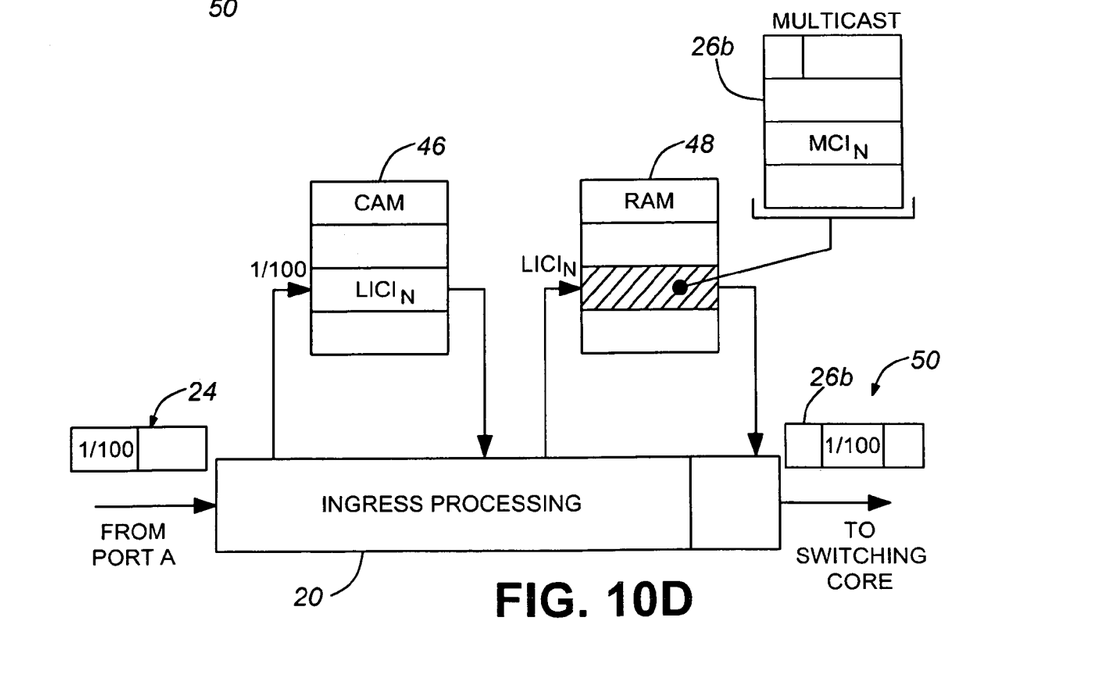

At step 102 of the FIG. 9 flowchart, control card 84 sends a message, including the multicast header 26b of step 98, to ingress interface card A. The message instructs ingress interface card A to transmit all ATM cells from port A having VPI/VCI=1/100 on the new MCI, $MCI_N$. This, as shown in FIG. 10(d), causes the ingress interface card A to alter its CAM 46 so that VPI/VCI=1/100 returns a new LICI, $LICI_N$, which points to the multicast 26b of step 98 that is stored in RAM 48 of card A. Thus, the ingress processing means 20 pre-pends the multicast header 26b having its MCI field set to $MCI_N$ to incoming ATM cells 24.

The transformation of point-to-point connection 76 into a point-to-multipoint connection, which involves software, is generally not faster than the typical speeds at which ATM switches transmit. Hence, it is likely that the ingress processing means 20 of ingress interface card A has added header 26a (addressing $ECI_O$) to a number of ATM cells 24 which may have not yet been processed by egress processing means 64 of egress interface card B. However, since at step 100 egress interface card B has been instructed to listen to the original ECI, $ECI_O$, as well as the new MCI, $MCI_N$, all cells on VPI/VCI=1/100 will be properly switched to virtual channel 2/200. For this reason, it is important that step 100 be carried out prior to step 102.

In addition, maintaining the original ECI entry in egress processing means 64 guarantees that the original connection 76 will be restored once the monitor TAC 74 is removed. This is because the switch 10 may be requested to establish many new connections during the period monitor TAC 74 is active. Hence, if the original ECI entry, which corresponds to an allocated connection consuming a specified amount of bandwidth, is removed, the switch may not allow the original connection 76 to be restored due to the unavailability of a free ECI (i.e. only a finite number of ECIs are provided on the switch).

At step 104 of the FIG. 9 flowchart, the control card 84 sends a message, including the multi-cast header 26b of step 98, to interface card C servicing TAC monitor point C. The message instructs the test interface card to add suitable entries to memories 70 and 72 so that the egress processing means 64 thereof will switch NATM cells 50 having an MCI field containing $MCI_N$ to test port C with VPI/VCI field set to virtual channel 3/300. This step 104 may be preformed prior to step 100 or 102 since it does not affect the cell stream of original connection 76.

At each step 100, 102 and 104, the control card 84 waits to receive an acknowledgement message back from the appropriate interface card 18 that the command sent by the control card has been executed before proceeding to the next step. This is because the internal messaging protocol of the preferred switch 10 does not guarantee strict sequencing of commands.

At step 106 of the FIG. 9 flowchart, an acknowledgement message is sent back to the NMTI 82 (FIG. 7) informing it that monitor TAC 74 has been successfully applied.

FIG. 9 also illustrates the preferred process for removing monitor TAC 74 without causing service disruption to connection 76. When the control card 84 receives a TAC removal request from the NMTI 82 at step 110, control card 84 sends ingress interface card a message at step 112 to return to transmit cells from port A having VPI/VCI=1/100 on the original ECI, $ECI_O$, as shown in FIG. 10(a). At this stage, the egress interface card B is still in the state illustrated in FIG. 10(b) wherein it is able to switch NATM cells 50 addressed with $ECI_O$ or $MCI_N$ to VPI/VCI=2/200 on port B, and thus there will be no cell loss or service disruption in respect of cross-connect 78. At step 114, control card 84 sends egress card B a message instructing it to remove the MCI entry from memories 70 and 72 which map cells arriving from port A on VPI/VCI=1/100 to VPI/VCI=2/200 on port B. Since the original ECI entry was not removed when the monitor TAC 74 was established, the egress interface card B automatically reverts to the original point-to-point state of connection 76 as shown in FIG. 10(b). At step 116, the control card 84 sends a message to the interface card servicing TAC point C to remove the point-to-multipoint $MCI_N$ entry to thereby terminate monitor TAC 74. This step may occur prior to step 112 or 114. At step 118, the control card 84 updates it calls-in-progress or cross-connect table to reflect the original state of point-to-point connection 76. Finally, at step 120, the control card 84 sends an acknowledgement message back to the NMTI 82 informing it that monitor TAC 74 has been successfully removed.

Figure 8:
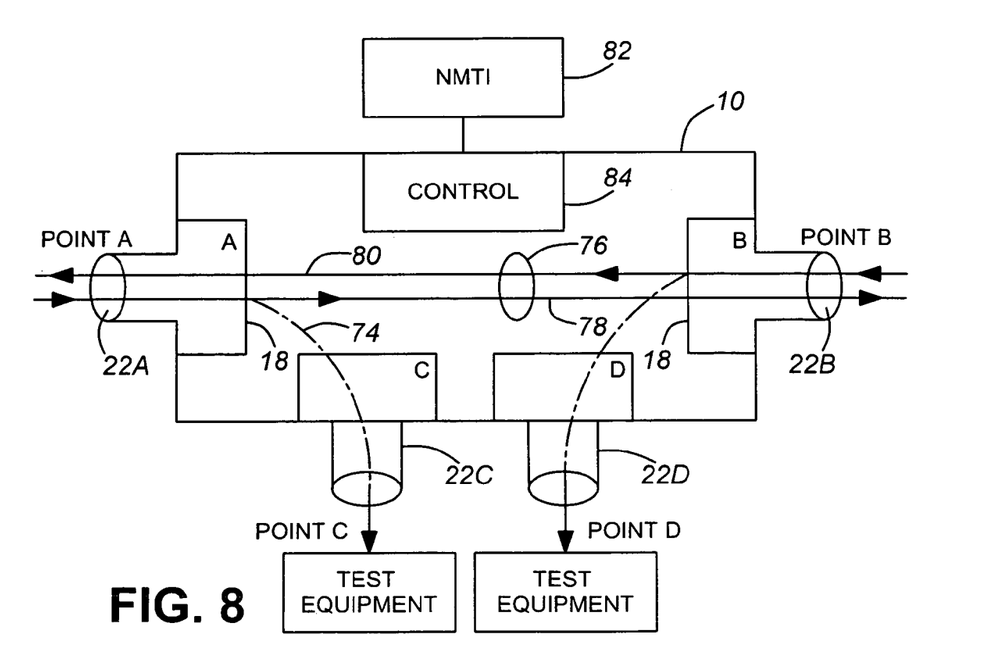
FIG. 8 is a schematic diagram illustrating the structure of a bi-directional test access connection in the packet switch.

FIG. 8 illustrates monitor TACs applied in both directions of connection 76. In the preferred embodiment, two TACs 74 and 75 are required to monitor the bi-directional traffic of connection 76. Each monitor TAC 74 and 75 is individually established as described above and as illustrated in FIG. 8 such that cross-connects are respectively established from target point A to TAC point C, and from target point B to TAC point D on port D.

In the preferred embodiment, control messages between the various cards in switch 10 are communicated using a virtual control channel as explained more fully in PCT Publication No. WO95/30318. A variety of message protocols can be employed to implement the control messaging between control card 84 and interface cards 18 in establishing and dismantling monitor TAC 74. In the preferred protocol, all messages relating to monitor TAC 74 include the following parameters: (a) a copy of the original message establishing a point-to-point connection between target point A and counterpoint B; (b) transmit information, including a version of multicast header 26b, informing the ingress card how to transmit on a new MCI; and (c) receive information, including a version of multicast header 26b, informing the egress card how to "listen" to a new MCI. (Thus, according to the preferred protocol, three versions of the multi-cast header 26b are created in step 98 since the addressing information for each point A, B, C is different.) This protocol or paradigm features a "create" attribute only, and hence a state table as shown in Table C below is employed in order to inform the interface cards 18 when to remove a TAC transmission or receive entry from its memories.

TABLE C

| | STATE | | | | | |
|---|---|---|---|---|---|---|
| MESSAGE | No Connection | P2P | P2MP | P2P + tx | P2P + rx | P2P + tx + rx |
| P2P | P2P | Do Nothing | P2P | Remove tx | Remove rx | Remove tx + rx |
| Deprogram | Do Nothing | Remove P2P | Remove P2MP | Remove P2P + tx | Remove P2P + rx | Remove P2P + tx + rx |
| P2P + tx + rx | P2P + tx + rx | Add tx + rx | P2P + tx + rx | Add rx | Add tx | Do Nothing |
| P2P + 0 + rx | P2P + rx | Add rx | P2P + rx | Remove tx Add rx | Do Nothing | Remove tx |
| P2P + tx + 0 | P2P + tx | Add tx | P2P + tx | Do Nothing | Remove rx Add tx | Remove rx |

Legend:
P2P point-to-point message
P2MP point-to-multipoint message
tx transmit information or state
rx receive information or state
0 no information The preferred embodiment, which is based on the 36170 platform, has a limitation that two leaves from the same source may not exist on the same port, and thus, points B and C, for instance, may not be located on the same physical port. However, those skilled in the art will realize that in alternative embodiments, the target point, its original counterpart, and the monitor TAC point may all be located on one physical port serviced by one interface card.

The preferred embodiment has also made reference to two different types of perpended headers used in the 36170 system, namely point-to-point or unicast header 26a and point-to-multipoint or multicast header 26b. In alternative embodiments, a single type of header having a bitmapped address field may be used, where setting a single bit in the bitmap constitutes or references a unicast or point-to-point connection, and the setting of multiple bits in the bitmap constitutes or references a multicast or point-to-multipoint connection. Similarly, those skilled in the art will appreciate that the invention is not limited by what has been particularly shown and described herein as numerous modifications and variations may be made to the preferred embodiment without departing from the spirit and scope of the invention.

What is claimed is:

1. A method of processing a stream of data packets in a packet switch to facilitate monitoring of said stream, said packet switch having one or more interface devices for servicing an input point, a first output point and a second output point of the switch, said method comprising the steps of:
   (a) configuring the device servicing the input point to attach overhead associated with a point-to-point connection to packets received at the input point in order to route the packets to the first output point;
   (b) configuring the device servicing the first output point to receive and process the packets having the point-to-point overhead attached thereto;
   (c) configuring the device servicing the second output point to receive and process packets having overhead attached thereto which is associated with a point-to-multipoint connection for routing packets from the input point to the first output point and from the input point to the second output point;
   (d) configuring the device servicing the first output point to additionally receive and process packets having the point-to-multipoint overhead attached thereto, wherein the configuration of the device servicing the first output point that results from step (b) remains unchanged; and
   (e) only after step (d) is completed, configuring the device servicing the input point to attach the point-to-multipoint overhead to packets received at the input point instead of attaching said overhead associated with said point-to-point connection;
thereby converting a point-to-point packet flow into a point-to-multipoint packet flow and enabling monitoring of data packets arriving at the second output point without disrupting the point-to-point packet flow.

2. The method according to claim 1, further comprising the steps of:
   (f) configuring the device servicing the second output point to stop receiving and processing packets having the point-to-multipoint overhead;
   (g) configuring the device servicing the input point to attach the point-to-point overhead to packets received at the input point; and
   (h) configuring the device servicing the first output point to stop receiving and processing packets having the point-to-multipoint overhead only after step (g) is completed;
thereby terminating the flow of packets to the second output point without disrupting the flow of packets to the first output point.

3. The method according to claim 2, wherein each switch point is referenced by at least an address of the interface device within the switch and a virtual path identifier.

4. The method according to claim 3, wherein the point-to-point overhead comprises a unique interface device address.

5. The method according to claim 3, wherein the point-to-multipoint overhead comprises a multicast interface card address referencing a plurality of interface cards.

6. The method according to claim 3, wherein the point-to-point overhead and the point-to-multipoint overhead comprise identical bitmaps, wherein the setting of a single bit identifies a point-to-point connection and the setting of plural bits identifies a point-to-multipoint connection.

7. The method according to claim 2, wherein said packet is a fixed-length cell.

8. The method according to claim 7, wherein said packet switch is a connection-oriented switch.

9. A method for converting a point-to-point packet flow from a first point to a second point in a packet switch into a point-to-multipoint packet flow from said first point to said second point and from said first point to a third point in said packet switch for monitoring packets arriving at the packet switch without disrupting said point-to-point packet flow, wherein said switch comprises one or more interface devices, connected to an internal switch bus, for servicing said first, second and third points, said method comprising the steps of:
   (a) configuring the device servicing said third point to retrieve from said bus packets addressed thereto which use a multicast addressing scheme for routing packets from said first point to said second point and from said first point to said third point;
   (b) configuring the device servicing said second point to additionally retrieve from said bus the multicast packets, wherein the device servicing the second point maintains an existing configuration to retrieve, from said bus, packets forming part of said point-to-point packet flow and which use a unicast addressing scheme;
   (c) only after step (b) is completed, configuring the device servicing said first point to address packets received at said first point to said second and third points using said multicast addressing scheme; and
   (d) monitoring the multicast packets arriving at said third point.

10. The method according to claim 9, further comprising the steps of:
   (e) configuring the device servicing the third point to stop retrieving said multicast packets;
   (f) configuring the device servicing the first point to address packets received thereat only to the second point; and
   (g) only after step (e) is completed, configuring the device servicing the second point to stop retrieving said multicast packets;
thereby terminating the flow of packets to said third point without disrupting the flow of packets to said second point.

11. The method according to claim 10, wherein the unicast addressing scheme comprises a unique interface card address.

12. The method according to claim 10, wherein the multicast addressing scheme comprises a multicast interface card address referencing a plurality of interface cards.

13. The method according to claim 10, wherein the unicast addressing scheme and the multicast addressing scheme comprise identical bitmaps, wherein the setting of a single bit identifies a point-to-point connection and the setting of plural bits identifies a point-to-multipoint connection.

14. The method according to claim 10, wherein said packet is a fixed-length cell.

15. A method of processing a stream of data packets in a packet switch arriving at an input point thereof to facilitate monitoring of said stream, said method comprising the steps of:
   (a) attaching overhead associated with a point-to-point connection to packets received at the input point in order to route the packets to a first output point;
   (b) receiving and processing the packets having the point-to-point overhead attached thereto at the first output point;
   (c) configuring a device servicing the first output point to additionally receive and process packets having overhead attached thereto which is associated with a point-to-multipoint connection for routing packets from the input point to the first output point and from the input point to a second output point, wherein the device servicing the first output point maintains an existing configuration to receive and process packets having the point-to-point overhead attached thereto;
   (d) only after step (c) is completed attaching the point-to-multipoint overhead to packets received at the input point; and
   (e) receiving and processing the packets having the point-to-multipoint overhead attached thereto at the second output point;
thereby converting a continuous point-to-point packet flow into a point-to-multipoint packet flow and enabling monitoring of data packets arriving at the second output point without disrupting the point-to-point packet flow.

16. The method according to claim 15, wherein the point-to-point overhead comprises a unique interface card address.

17. The method according to claim 15, wherein the point-to-multipoint overhead comprises a multicast interface card address referencing a plurality of interface cards.

18. The method according to claim 15, wherein the point-to-point overhead and the point-to-multipoint overhead comprise identical bitmaps, wherein the setting of a single bit identifies a point-to-point connection and the setting of plural bits identifies a point-to-multipoint connection.

19. The method according to claim 15, further comprising the steps of:
   (f) terminating the reception and processing of packets having the point-to-multipoint overhead at the second output point;
   (g) attaching the point-to-point overhead to packets received at the input point; and
   (h) terminating the reception and processing of packets having the point-to-multipoint overhead at the first output point only after step (g) is completed;
thereby terminating the flow of packets to the second output point without disrupting the flow of packets to the first output point.

20. The method according to claim 19, wherein each switch point is referenced by at least an address of an interface card within the switch and a virtual path identifier.

21. The method according to claim 19, wherein the point-to-point overhead comprises a unique interface card address.

22. The method according to claim 19, wherein the point-to-multipoint overhead comprises a multicast interface card address referencing a plurality of interface cards.

23. The method according to claim 19, wherein the point-to-point overhead and the point-to-multipoint overhead comprise identical bitmaps, wherein the setting of a single bit identifies a point-to-point connection and the setting of plural bits identifies a point-to-multipoint connection.

24. The method according to claim 19, wherein the packet is a fixed-length cell.

25. A method of non-disruptive monitoring of a point-to-point (P2P) connection established in a connection oriented network across a switching node, comprising:
   (a) receiving at a point A on an ingress interface of the switching node a protocol data unit (PDU) carried in the P2P connection and routing the PDU to a point B on an egress interface of the switching node, said P2P connection extending through the point A to the point B;
   (b) receiving a request for monitoring the P2P connection in the point A and creating a test point C on a second egress interface of the switching node;
   (c) configuring the point A, point B and test point C for establishing a point-to-multipoint (P2M) connection between the points A and B and between the point A and test point C, without impairing operation of the P2P connection;
   (d) switching the PDU from the P2P connection to the P2M connection without tearing down the P2P connection; and
   (f) at the test point C, monitoring and testing the PDU and other PDU's arriving at the point A along the P2P connection.

26. The method of claim 25, wherein step (a) comprises:
   assembling a unicast header based on a network address of the PDU, the unicast header having an egress connection identifier identifying the point B as a unique destination of the PDU arriving from the point A via the P2P connection, and providing the egress connection identifier to the points A and B; and
   appending the unicast header to the PDU and, based on the egress connection identifier, perform said routing the PDU to the point B;
wherein after said routing the PDU to the point B, at the point B determining the network address of the PDU based on the egress connection identifier in the unicast header, stripping the unicast header from the PDU, mapping the network address into the PDU, and transmitting the PDU from the point B to a destination address provided by the network address.

27. The method of claim 26, wherein step (b) comprises:
   (b1) checking validity of the point A by confirming whether the point A is an endpoint of the P2P connection on the switching node;
   (b2) checking whether the switching node enables routing of a monitor test access connection associated with the P2M connection between the point A and the test point C; and
   (b3) if the checking steps b1) and b1) both return an affirmative result, updating a routing table of the switching node to account for the monitor test access connection.

28. The method of claim 27, wherein step (c) comprises:
assembling a multicast header based on the network address of the PDU, the multicast header including a multicast connection identifier and providing the multicast connection identifier to the points A, B and C;
configuring the point B to receive any PDU received from the point A having the unicast connection identifier and the multicast connection identifier;
configuring the point A to additionally enable transmission of the PDU along the P2M connection using the multicast connection identifier after the point B is ready to receive PDU's with the multicast connection identifier; and
configuring the test point C to receive any PDU received from the point A and having a multicast connection identifier of the multicast connection on identifier.

29. The method of claim 28, wherein step (d) comprises, at the point A:
appending the multicast header to the PDU;
transmitting the PDU with the multicast header in the P2M connection to the point B using the multicast connection identifier rather than in the P2P connection using the unicast connection identifier; and
transmitting a duplicate of the PDU with the multicast header from the point A to the test point C using the multicast connection identifier.

30. The method of claim 29, further comprising (f) tearing-down the P2M connection once the monitoring of PDU's arriving at the point A along the P2P connection is completed.

31. The method of claim 30, wherein step (f) comprises;
(f1) configuring the point A to append the unicast header to incoming PDU's and transmitting said incoming PDU's along the P2P connection rather than along the P2M connection;
(f2) after completing step f1), deleting the multicast connection identifier at the points A, B and C to disable the P2M connection.

* * * * *

UNITED STATES PATENT AND TRADEMARK OFFICE
CERTIFICATE OF CORRECTION

| | |
|---|---|
| PATENT NO. | : 7,023,804 B1 |
| APPLICATION NO. | : 09/558589 |
| DATED | : April 4, 2006 |
| INVENTOR(S) | : Amro Younes et al. |

It is certified that error appears in the above-identified patent and that said Letters Patent is hereby corrected as shown below:

Column 17, line 16, delete "on".

Signed and Sealed this

Twentieth Day of March, 2007

JON W. DUDAS
*Director of the United States Patent and Trademark Office*